US011950717B1

(12) United States Patent
Scherr

(10) Patent No.: US 11,950,717 B1
(45) Date of Patent: Apr. 9, 2024

(54) CHESAPEAKE OPENER

(71) Applicant: Thomas Scherr, Windsor Mill, MD (US)

(72) Inventor: Thomas Scherr, Windsor Mill, MD (US)

( * ) Notice: Subject to any disclaimer, the term of this patent is extended or adjusted under 35 U.S.C. 154(b) by 0 days.

(21) Appl. No.: 18/186,032

(22) Filed: Mar. 17, 2023

(51) Int. Cl.
*A47G 21/06* (2006.01)
*A22C 29/02* (2006.01)

(52) U.S. Cl.
CPC ......... *A47G 21/065* (2013.01); *A47G 21/061* (2013.01); *A22C 29/024* (2013.01)

(58) Field of Classification Search
CPC ............... A47G 21/065; A47G 21/061; A22C 29/025–027
USPC ................... 452/6, 17; 30/120.1–120.5, 137, 30/147–150, 408; D7/643, 653; D8/16, D8/18, 19, 34, 105; 7/152
See application file for complete search history.

(56) References Cited

U.S. PATENT DOCUMENTS

| | | | |
|---|---|---|---|
| 165,729 A * | 7/1875 | Hagerty | B67B 7/38 7/152 |
| 773,428 A * | 10/1904 | Sickles | A47G 27/0487 7/152 |
| D45,189 S * | 2/1914 | Ford | 30/325 |
| D52,045 S * | 5/1918 | Mathieson | 30/148 |
| 2,568,612 A * | 9/1951 | Cullen | B67B 7/44 7/152 |
| 4,535,987 A * | 8/1985 | Dikoff | A63B 57/60 273/DIG. 26 |
| 4,610,087 A * | 9/1986 | Mickelson | B26B 3/00 D7/650 |
| D302,514 S * | 8/1989 | Gates | D8/27 |
| D365,254 S * | 12/1995 | Pizzati | D7/688 |
| D365,424 S * | 12/1995 | Weller | D8/16 |
| D496,236 S * | 9/2004 | Marsden | D8/18 |
| 7,024,777 B1 * | 4/2006 | Bach | A47G 21/061 30/147 |
| D589,589 S * | 3/2009 | McCloudry | D8/19 |
| 9,888,698 B1 * | 2/2018 | Morsell | A22C 29/027 |
| D842,069 S * | 3/2019 | Kao | D7/643 |
| D879,581 S * | 3/2020 | Arakelian | D8/19 |
| D893,975 S * | 8/2020 | Tran | D8/19 |
| D966,850 S * | 10/2022 | Sung | D8/100 |
| D992,997 S * | 7/2023 | Zeng | D7/643 |
| 2006/0143927 A1 * | 7/2006 | Bach | A47G 21/061 30/147 |
| 2015/0093480 A1 * | 4/2015 | Biever | A47J 43/28 294/7 |

* cited by examiner

Primary Examiner — Laura M Lee

(57) ABSTRACT

A seafood opener comprising a fork located on a first end configured to remove shells from seafood. The fork is further configured to be used as a hammer to crack the shells of seafood. A second end of the seafood opener includes a pry blade configured to pry oysters or clams open in order to access the meat inside. A bottle opener is also located on the first end of the seafood opener.

1 Claim, 2 Drawing Sheets

CHESAPEAKE OPENER

BACKGROUND OF THE INVENTION

In our Family, eating crabs has always been and always will be a year-round family tradition. When I was a little boy just six-years old I became fascinated with CRABS, especially while I watched my Dad, mom and their friends eating crabs all the lime at home and restaurants. My grandfather introduced my father and my aunt to eating crabs at an early age. And over the years my Dad came up with a unique procedure to easily and quickly take Chesapeake Blue Crabs apart. He invented the simple steps to get the crab meat out in about a minute. My Dad and I continued to refine this very nontraditional way of taking a crab apart. I have perfected that original method, plus, I have invented a tool called the seafood opener, that makes it even easier and faster than ever to open Chesapeake Blue Crabs. People say seafood opener is the greatest Seafood Opener ever invented. I now teach the steps to open Chesapeake Bay crabs and sell the. I will tell you more about this unique method and the seafood opener, in a just minute.

I spent many happy years growing-up on the beaches and waterways of Ocean City and Eastern Shore, Maryland. My Dad's big sister and her husband owned apartment buildings in Ocean City. My family and I would go on frequent trips to Ocean City during the off-season, and then stay for the entire summer when school let-out. I loved the beach and being around the water eating crabs all the time. Dad and Mom grew-up in Baltimore, so I have a lot of family in Baltimore. When I was growing-up, I traveled and lived along the whole Eastern Seaboard, but moved back to Baltimore to live were my roots are.

Maryland is the seafood capital of the world, and the home of the sweetest crabs in the world. I still have lots of family living in Baltimore where grandfather introduced my Dad and my Aunt to eating Chesapeake Blue Crabs at a ripe young age and I likewise introduced my daughter Chloe to eating crabs at a young age.

Maryland is the seafood capital of the world, and the home of the sweetest crabs in the world. I still have lots of family living in Baltimore where grandfather introduced my Dad and my Aunt to eating Chesapeake Blue Crabs at a ripe young age and I likewise introduced my daughter Chloe to eating crabs at a young age. Again, getting together with family and friends to enjoy Chesapeake Blue Crabs together will always be a family tradition.

Dad would open the outer shell, take off the lungs and front, and then turn the crab upside down leaving the legs and claws attached. He would then give the crab a nice adjustment by pushing it down firmly between his palm and the table, and then he split it in half. Next, he took one-half of the crab in his palm, with the top-side up and aligned with the fore finger, and squeezed the sides with his thumb and index finger, with his index finger lightly bending over his palm. Then he would lift the torso shell up, exposing all the meat. Then you can use the legs as handles for extensions for your mouth. As I was growing up, I learned that this was a much better way to open and eat crab than most people know.

Over a few short years I became very, very good at opening and eating crabs. I became so much faster than the grown-ups that it was funny. One time in a restaurant with family and friends I was sitting at a long table across from Dad. I was eating so many crabs and spitting out shells so fast that they were hitting Dad. I had to move my seat to the end of the table. Dad began taking me to crab eating tournaments each year and we would always win first place for eating the most crabs in an hour. Over the years my Dad and I won First Place cash prizes, trophies and plaques. The last tournament I was in I opened and ate 74 crabs in one hour. I have appeared on television four times and I have been featured in many magazines for "Crabology", as a "Crab Eating Specialist".

SUMMARY OF THE INVENTION

I invented the seafood opener because I knew there had to be a better way to open crabs than using our fingernails to remove the Torso Shell. Sometimes it can be hard to use our finger nails to take off the torso shell. I invented the seafood opener so we do not have to use our fingernails when we are eating crabs. This is especially nice for lady's to not damage their finger nails.

The seafood opener is somewhat similar in appearance to a large fork. The prongs of The seafood opener are designed to fit in between the joints between the legs to pry the Torso open. The seafood opener enables you to pry open and remove the entire Torso of the crab in one step and reveal all of the crab meat inside the body. This is a much simpler, easier and faster way to remove the Torso of a Blue Crab without using your finger nails, and eat a crab in less than a minute. The opposite end of the seafood opener is perfect for removing the meat from the crab claws and for shucking oysters and clams. The side of the opener is used as a hammer for opening the claws and is great for removing the meat. Using the fork of the seafood opener is also excellent for opening king crab legs, snow crab legs and lobster. In the middle of the seafood opener is a bottle cap opener, which is handy anytime.

Always keep a seafood handy at home and in the car. You are a winner at any seafood dinner with Tommy Scherr's Famous Original (seafood opener).

Before the seafood opener was invented, we had to use our fingernails so forcefully to pry open the shells that it could damage our nails. And ladies can tell you what opening seafood can do to their fingernails. Using the seafood opener instead eliminates the wear and tear on fingernails. When it COMBS to opening a wide variety of seafood such as crabs, lobsters, king crab, oysters, clams, scallops, mussels and so on, the multi-purpose seafood opener can easily and quickly open every single one. The seafood opener was invented to make it easy and fast for ladies to open and enjoy a wide variety of seafood without damaging their manicures. When it comes to opening and eating seafood, Tommy Scherr's Original Chesapeake Opener (seafood opener) is every lady's best friend.

The seafood opener is a multi-purpose seafood opening utensil, or seafood opening tool. One seafood opener does the job of multiple seafood opening tools because the seafood opener is actually several tools in one. For instance, Chesapeake Blue Crabs and crabs in general are considered to be the most difficult of all seafood to open. But the seafood opener is a game changer. The seafood opener makes it quite easy to open and eat a crab in only about a minute. The seafood opener is a Torso opener, a Claw opener and a Leg opener tool The seafood opener is an all-in one handy and easy to use seafood-opening tool.

The fork end the seafood opener has four Specially Spaced and Shaped Prongs with tapered ends that are able to get into the joints of the crab and separate the entire torso shell from the body of the crab, in one step. This exposes the delicious meat throughout the entire body of the crab. The seafood opener has A Hammer on Both Sides of the forked end for cracking claws and legs. And on the opposite end the has A Single Prong with a tapered end to pry open shells and to pick-out the meat. The seafood opener even has A Bottle Opener! Plus, the seafood opener has been Ergonomically Designed to be comfortable and easy to use for all ages.

Figure 1:
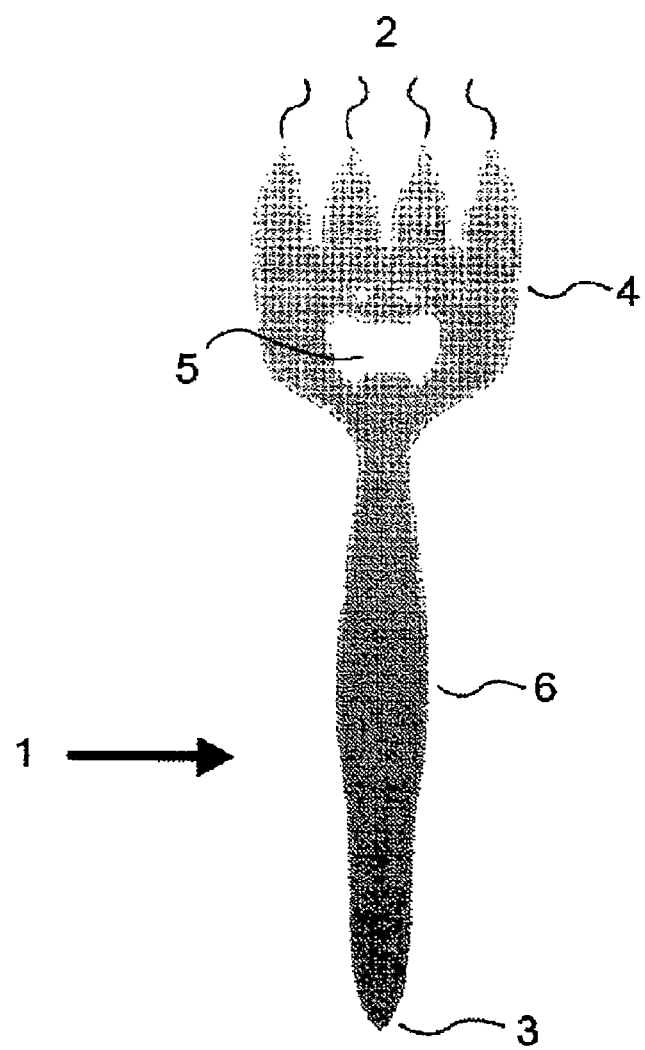
FIG. 1 is a Front View drawing of the seafood opener. At the top of the drawing are the Four Prongs of the Fork End that are tapered and are used to separate the entire torso shell and legs from the main body of the crab, all at the same time in one step. The tapered ends of the Prongs enable the ends to go into the four leg joints of the crab and pry them apart. This exposes the meat throughout the entire main body of the crab which is a beautiful sight. The Sides of the fork end of the seafood opener are used as Hammers for cracking the claw and leg shells. At the opposite end of the seafood opener is the Single Prong which is tapered at the end for prying open the shells and picking out the meat. The tapered end of the Prong enables the prong to slide In between the shell halves of oysters, dams, scallops and muscles and such to open the shell and remove the meat.
Figure 2:
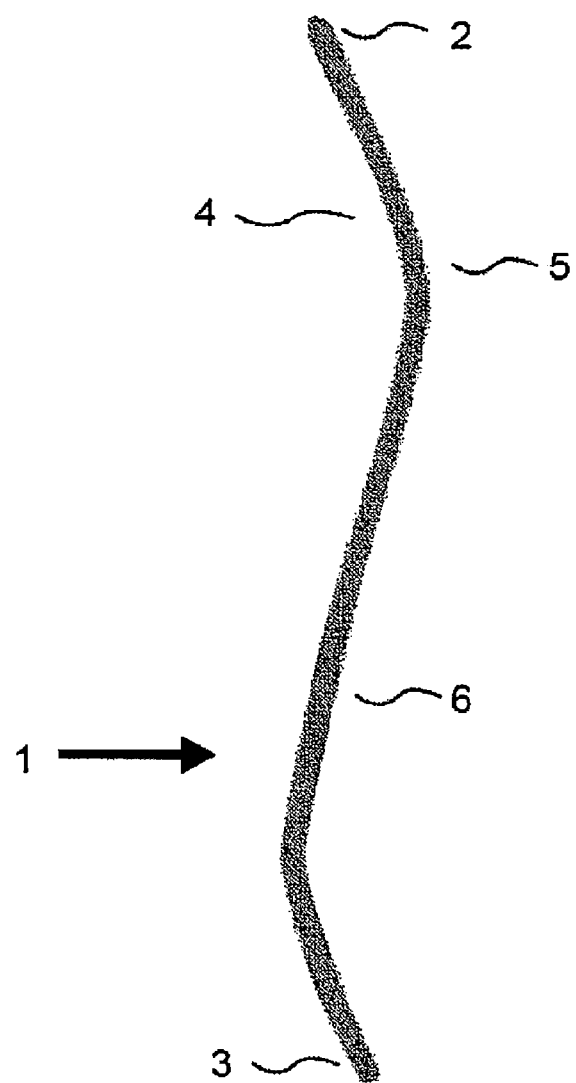
FIG. 2 is a Side View Drawing of the seafood opener, which shows the ergonomic bent design near both ends for comfort and ease of use and for leverage. This drawing also shows the taper on the ends of the prongs.

At first blush the seafood opener seems to be somewhat similar in appearance to a large serving fork. But in taking a closer look we see that it is actually quite different, both in the design of the seafood opener, and in the specific task that the seafood opener is designed to accomplish. Extensive prototyping has developed the seafood opener, and testing has proved that the disclosed seafood opener is an excellent Multi Purpose Seafood Opener.

The most important step in the process of eating a crab is removing the Torso shell. I invented the seafood opener because I realized I could create a special tool to accomplish this important step of removing the Torso shell intact, instead of using our fingernails to pry off the Torso shell, which would always come off in broken bits and pieces. The seafood opener evolved from my original design to this design today. Again, the shape and spacing of the Prongs with their tapered ends is the perfect utensil or tool to get in between the joints and easily remove the complete Torso Shell all in ono amazing step that exposes all the meat inside the body of the crab.

Anyone can use the seafood opener to easily and quickly remove the entire Torso shell and completely expose all of the beautiful meat in the main body of the crab. When the Torso shell has been removed the legs will still be attached to the meat in the body of the crab. The legs with the crab meat can be used as handles to lift the crab meal to your mouth.

DETAILED DESCRIPTION OF THE INVENTION

Located above the handle (6) of the seafood opener (1) are the Four Prongs of the Fork with tapered ends (2) that are purposefully shaped and spaced to fit in between the joints of the crab and separate the complete Torso Shell in one piece from the main body of the crab, in one step. Located at the opposite end from the fork end is the Single Prong that has a tapered end (3). This end is used to pry open crab legs, shells and to remove the meat. The edge surfaces (4) located on both sides of the fork end (2) are used as hammers (4).

The hammers are used to crack open Crab Claws and Legs and can even chip the sides of Oysters and Clams to locate a place to insert the Single Prong to pry-open Oysters and Clams to get the meat out. The seafood opener also has a Bottle Opener (5) located behind the four-fork end (2).

The dimensions of the seafood opener are as follows: The Length (1) is seven and one-half inches (7½"). The Fork End (2) is two inches wide (2'). The ends of the Prongs (2) and (3) have a one-eighth inch long (⅛") taper in thickness at the ends. The Hammer (4) is one-sixteenth inch (1/16") in thickness. The Bottle Opener (5) has a standard-size opening. The handle (6) is one-inch (1") wide at the mid-point and tapers to meet the Fork end (4) and the Single Prong end (1).

Open and eat a crab in less than one minute. Great for Crabs, Lobster, King Crab, Snow Crab, Oysters, Clams any type of seafood.

Steps for Opening and Eating Delicious Chesapeake Blue-Point Crab

Step One: Leaving the legs and claws attached, stand the crab up on its point of the table so the other point is up. With your thumb holding the last leg called the swimmer, use your other hand hold the top point of outer shell pull off shell.

Step Two: Scoop, scoop, scoop off lungs on each side really good and then remove the mouth in front. (If you eat the lungs you might get sick.)

Step Three: Put the exposed side of the crab down on the table and give It a nice "adjustment" by pushing down firmly (with the crab between your palm and the table) on the crab with the palm of your hand. You will hear a crunching sound as the bones holding the meat are cracked!

Step Four: Turn the crab over, hold crab topside up with thumbs out with both hands and snap crab up in towards you, then take off the middle apron from one side of the crab, if crab is still firm give another adjustment pushing top with palm.

Step Five: Take one half of the crab with its claws and legs extending straight out and hold crab with thumb and index finger and squeeze lightly. Then put half crab facing out of index finger feeling smooth like a glove.

Step Six: Using the seafood opener fork end go into the torso part of the crab joints and lift off the remaining shell which exposes all the crab meat.

Step Seven: Use the crab legs for extensions to lift the meat to your mouth to eat the crab in no time at all.

Step Eight: For claws use the side of the fork end of the seafood opener as a hammer and the other side to remove the meat very easily. Don't forget to use the bottle opener.

Step Nine: Select your next crab and ENJOY every step.

The invention claimed is:

1. A seafood opener for opening seafood comprising:
a handle extending along a longitudinal axis having a first end and a second end at opposite ends of the longitudinal axis, said handle having a taper that extends from a mid-point of the handle to each of said first end and said second end along the longitudinal axis;
a fork portion extending from said first end, said fork portion comprising two side edges on opposite sides of said fork portion configured for hammering seafood, a plurality of prongs extending between said two sides edges, each of said prongs having two sides that are coplanar with the two side edges and taper to a point configured for prying open seafood, and a bottle opener extending through the center of the of fork portion between said two side edges;
a single prong extending from said second end of said handle and having a tapered end that extends to a point along the longitudinal axis; and wherein the elongated handle comprises a first bend and a second bend at the first end and second end, respectively, said bend at said first end extends from the forked end away from the handle and said second bend at said second end extends from said single prong away from said handle, wherein said first bend and said second bend extend in opposite directions away from the longitudinal axis.

* * * * *